Apr. 24, 1923.

H. STAUB

GAITER OF SPRINGS

Filed Aug. 1, 1922

1,452,853

Inventor:
Henri Staub,
By
Atty.

Patented Apr. 24, 1923.

1,452,853

UNITED STATES PATENT OFFICE.

HENRI STAUB, OF MANOIR DU CYGNE, COPPET, SWITZERLAND.

GAITER OF SPRINGS.

Application filed August 1, 1922. Serial No. 578,959.

*To all whom it may concern:*

Be it known that I, HENRI STAUB, a citizen of the Republic of Switzerland, residing at Manoir du Cygne, Coppet, Canton of Vaud, Switzerland, have invented certain new and useful Improvements in or Relating to the Gaiters of Springs, of which the following is a specification, reference being had therein to the accompanying drawing.

It has been proposed to enclose leaf springs of motor car suspension systems in protective covers of soft material, the object of which is to protect lubricant introduced between the separate spring layers from contact or mixing with dust, water and mud and to keep it in the spring. It was also sought to cause the protective cover to lie tightly against the spring over its entire length. It has been found, however, that the spring is thereby obstructed in its movements and that lubricant, which has been introduced, can run out of the cover.

These disadvantages are prevented according to the present invention, which relates to a protective covering for leaf springs, more particularly of motor car suspension systems, by a space being left between the protective cover and the spring, so that the protective cover encloses a chamber for the reception of a lubricant for lubricating the spring.

The provision of an actual chamber for the lubricant has the object of leaving the spring full freedom of movement, while enclosing it hermetically, and to lubricate it in the most thorough manner by immersion, for instance in an oil bath, so as to reduce to a minimum the friction between the various layers of the spring.

In the accompanying drawing a constructional form of the invention is shown by way of example.

Figure 1:
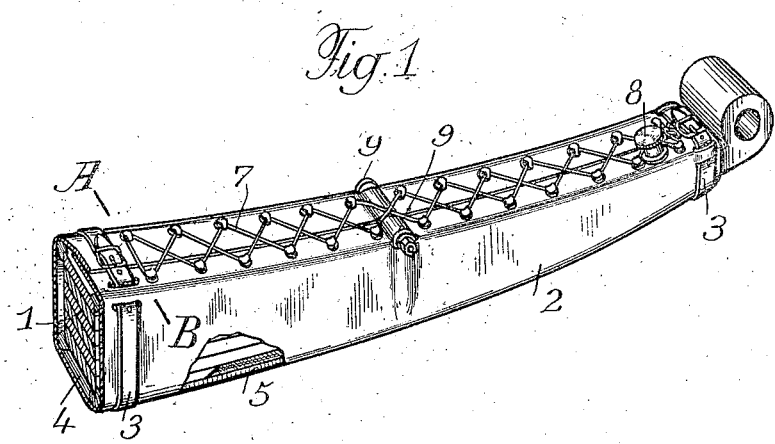
Fig. 1 is a perspective view of a leaf spring fitted with the protective cover according to the invention.
Figure 2:
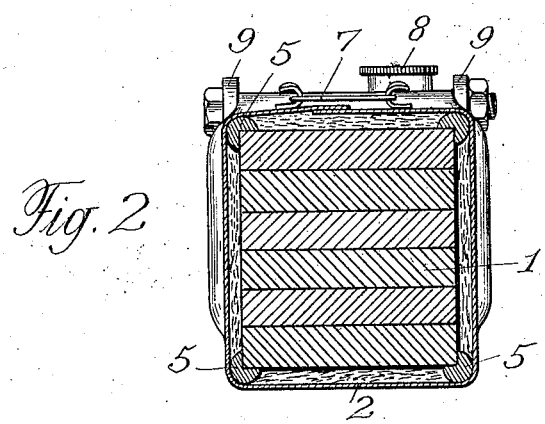
Fig. 2 shows a cross-section on A—B of Fig. 1 to an enlarged scale.

1 is the spring built up of layered leaf springs, about half the length of the spring being shown in Figure 1. Each longitudinal half of the spring is enclosed in a protective cover 2, one end of which reaches nearly to the eye of the spring and the other end nearly to the point of connection of the spring to the axle of the wheel. At either end the protective cover, which is preferably made of leather, is strapped firmly to the spring by a closure 3, in this case represented by a strap, in such a manner that these connecting places are perfectly tight. For this purpose at the ends of the cover a soft intermediate layer 4 is provided between the cover and the spring at the closures 3, which allows neither water nor dust to penetrate. Between the said ends along each of the corners formed by the spring in cross-section there extends an insertion 5 of material, which is permeable to lubricant. By the provision of the insertions 5 hollow spaces are formed round about the spring, providing storage spaces for the lubricant, which consists for instance of oil. These hollow spaces may with advantage be filled with a kind of oil sponge. At its overlapping longitudinal edges on the upper side of the spring the protective cover is closed by closing means 7, which facilitate the attachment and removal of the cover and which in the example shown are represented by a hook and lace fastening. By this closure being at the top, provision is made for preventing any leakage of the lubricant from the cover at the under side of the spring and for preventing water, sand and the like from entering the cover from below or from the side, when the vehicle is being cleaned by a jet of water. The protective cover is provided in the part lying on the upper side of the spring with a filling nipple 8 for the lubricant, which can be closed with a cap. 9 is a connecting stirrup for the spring, which partially projects out of the cover; the lubricant is, however, prevented from escaping at this place as well, owing to suitable packing of the apertures provided in the cover for the stirrup.

When the chamber enclosed by the cover is filled with oil, the spring will be immersed in an oil bath, in which the spring can move freely. Oil will flow round about the spring and will penetrate into all the interstices of the spring, so that by reducing the friction as far as possible, the greatest efficiency of the spring is secured.

Through fitting a closable outlet in the lowest part of the cover, provision can be made for readily renewing the oil bath. Fresh oil is poured in through the inlet nipple 8 fitted in the highest part of the cover. The fresh oil then slowly flows from the inlet to the outlet. The renewal of the oil bath may be effected from time to time or continuously by the oil flowing in and out drop by drop.

Figure 3:
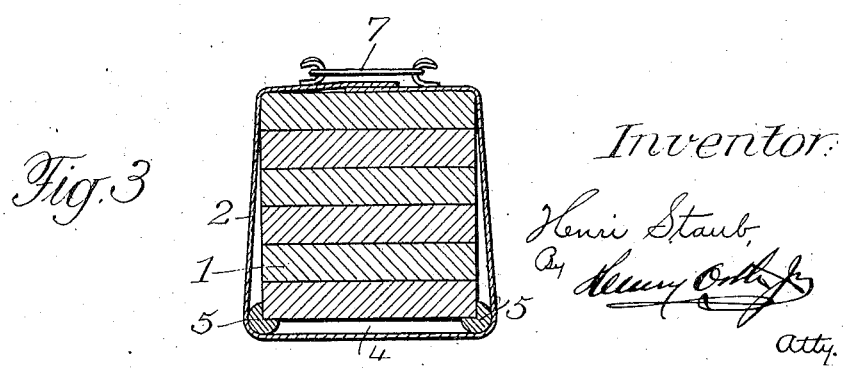
Fig. 3 is a detail modification of Fig. 2.

Instead of the protective cover leaving a free space on all sides of the spring, a free space might for instance be left only at the bottom and at the two sides between the cover and the spring. For forming these three spaces, two insertions 5 at the two lower edges of the spring will be sufficient as is shown in Fig. 3.

I claim:

1. A new article of manufacture comprising a protective cover for leaf springs, and insertions provided at the corners formed by the springs in cross-section and adapted to keep the cover at a distance from the spring so that the former encloses a chamber for the reception of a lubricant.

2. A new article of manufacture comprising a protective cover for leaf springs, closing means for said cover provided on the upper side of the spring for its ready attachment and removal, and insertions provided at the corners formed by the spring in cross-section and adapted to keep the cover at a distance from the spring, so that the former encloses a chamber for the reception of a lubricant.

In testimony whereof I affix my signature.

HENRI STAUB.